United States Patent
Imai

(10) Patent No.: US 6,957,039 B2
(45) Date of Patent: Oct. 18, 2005

(54) SATELLITE RECEIVING CONVERTER AND SATELLITE RECEIVING SYSTEM

(75) Inventor: Takao Imai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 367 days.

(21) Appl. No.: 10/202,881

(22) Filed: Jul. 26, 2002

(65) Prior Publication Data

US 2003/0022644 A1 Jan. 30, 2003

(30) Foreign Application Priority Data

Jul. 26, 2001 (JP) .............................. 2001-226742
Jul. 25, 2002 (JP) .............................. 2002-216539

(51) Int. Cl.[7] .............................................. H04H 1/00
(52) U.S. Cl. ..................................... 455/3.02; 455/313
(58) Field of Search .............................. 455/3.01, 3.02, 455/3.03, 3.04, 193.1, 313, 314, 323; 348/14.02, 348/725; 725/63, 68, 71, 69

(56) References Cited

U.S. PATENT DOCUMENTS

| | | | | |
|---|---|---|---|---|
| 4,777,657 A | * | 10/1988 | Gillaspie | ................. 455/186.1 |
| 5,301,352 A | * | 4/1994 | Nakagawa et al. | ............ 725/71 |
| 5,386,587 A | * | 1/1995 | Yuzawa | ...................... 455/3.02 |
| 5,649,311 A | * | 7/1997 | Somei | ...................... 455/188.1 |
| 5,670,902 A | | 9/1997 | Nakagawa et al. | |
| 6,075,970 A | | 6/2000 | Van Amesfoort | |
| 6,472,958 B2 | * | 10/2002 | Nakamura | ................... 333/181 |
| 2003/0022653 A1 | * | 1/2003 | Okahashi | ..................... 455/334 |
| 2003/0083034 A1 | * | 5/2003 | Motoyama | .................. 455/323 |

FOREIGN PATENT DOCUMENTS

| | | |
|---|---|---|
| EP | 1 024 613 A2 | 8/2000 |
| JP | 59087663 * | 5/1984 |

* cited by examiner

Primary Examiner—Nguyen T. Vo
(74) Attorney, Agent, or Firm—Birch, Stewart, Kolasch & Birch, LLP

(57) ABSTRACT

A satellite receiving converter of the present invention performs receiving operation in response to a pulse signal supplied from a tuner. To prevent an amplitude of the pulse signal from being largely reduced in the receiving operation, the satellite receiving converter includes a trap circuit made up of an inductor and a capacitor. The trap circuit is provided after a low-pass filter which divides a pulse signal and a direct-current voltage supplied to a regulator IC. The trap circuit is provided so as to raise impedance with respect to the pulse signal at a signal input-output terminal, thereby preventing error operation of an internal circuit, such as a control circuit.

12 Claims, 6 Drawing Sheets

SATELLITE RECEIVING CONVERTER AND SATELLITE RECEIVING SYSTEM

FIELD OF THE INVENTION

The present invention relates to arrangements of a circuit included in a satellite receiving converter which is realized as a LNB (Low Noise Block downconverter) and a satellite receiving system adopting the satellite receiving converter.

BACKGROUND OF THE INVENTION

A LNB is a component attached to the edge of a BS antenna or a CS antenna. The LNB receives a feeble signal of about 12 GHz from a satellite, and amplifies the signal with a low-noise amplifier. Then the LNB converts the signal to an intermediate frequency signal by mixing it with a local oscillation signal in a mixing circuit, and outputs to an external tuner.

FIG. 5 is a block diagram showing an electrical arrangement of LNB1 adopting a typical conventional technology. This LNB1 is destined for Europe. In the LNB1, a signal of horizontally-polarized wave is inputted to a terminal t1 and a signal of vertically-polarized wave is inputted to a terminal t2, from a receiving horn (not shown).

As it will be described later, the inputted signals are respectively amplified by LNAs (Low Noise Amp) a1 and a2 which are selectively activated by a control circuit ct1, then are inputted to a mixer m via a common high frequency filter f. Further, a local oscillation signal is inputted to the mixer m from local oscillators 1o1 and 1o2 which are selectively activated by the control circuit ct1.

The mixer m downconverts a low-band signal inputted from the terminal t1 or the terminal t2 to an intermediate frequency signal of 950 MHz to 1950 MHz, by mixing it with a local oscillation signal of 9.75 GHz, which is inputted from the local oscillator 1o1. Meanwhile, the mixer m downconverts a high-band signal inputted from the terminal t1 or the terminal t2 to an intermediate frequency signal of 1150 MHz to 2150 MHz, by mixing it with a local oscillation signal of 10.6 GHz, which is inputted from the local oscillator 1o2.

The intermediate frequency signal is outputted to a signal input-output terminal t3 via two stages IF (intermediate frequency) amplifiers a11 and a12 and a coupling capacitor c1. Further, the intermediate frequency signal is inputted to an external tuner tu from the signal input-output terminal t3 via a co-axial cable k.

Meanwhile, a direct-current voltage, used as a power source and for switching polarization wave, and a control signal for selecting a receiving band are inputted to the signal input-output terminal t3 from the tuner tu via the co-axial cable k. The control signal is a pulse signal having the maximum amplitude Vs of 0.8 $V_{p-p}$ and the frequency f of 22 kHz, for example. The control signal is inputted to the control circuit ct1 via a low-pass filter which cuts off the intermediate frequency signal. The low-pass filter is made up of an inductor 1 and a capacitor c2.

The control circuit ct1 selectively activates the local oscillators 1o1 and 1o2 in response to the control signal. The direct-current voltage is inputted to a regulator ICrg and the control circuit ct1 via the low-pass filter. The regulator ICrg stabilizes the supplied direct-current voltage to be a predetermined voltage and supplies the voltage to respective circuits as the power source. The regulator LCrg is equipped with an input capacitor and an output capacitor (both not shown) so as to compose a power supply circuit. The control circuit ct1 switches between the LNAs a1 and a2 according to the inputted direct-current voltage, which are either of 13V or 18V.

In the LNB1 having the foregoing arrangement, conventionally, a single tuner is connected to a single LNB when receiving services (such as an image). However, as the development of services, such as provision of larger number of channels, various arrangements of the system has been realized. For example, a single LNB receives plural satellites, or a single LNB is connected to plural tuners.

Therefore, a new type of LNB has become popular, which is arranged such that the pulse signal inputted from the tuner tu is used for making selection of satellites when plural satellites are received with a single LNB, or for making a selection of plural polarization waves received with the LNB, and a detector circuit provided in the LNB1 (included in the described control circuit ct1) performs switching operation for making those selections (For example, see Japanese Patent Publication No. 2988844 (published on Nov. 5, 1996)).

In this type of LNB, the amplitude WL of the pulse signal at the signal input-output circuit t3 is denoted by the following equation, $$WL = Wt \times XL \div (XL + Xc + Xt)$$

where:

XL represents impedance at the signal input-output circuit t3 with respect to a frequency of the pulse signal;

Xt represents impedance in the tuner tu with respect to the frequency of the pulse signal;

Xc represents impedance in a transmission line such as the co-axial cable k provided between the LNB1 and the tuner tu; and Wt represents the amplitude of the pulse signal outputted from the tuner tu.

Generally, the impedance XL is dozens of Ω, and the impedance Xt is several Ω.

Accordingly, when a switching device 3 is provided between the plural LNBs1 and the tuner tu as shown in FIG. 6 so as to carry out switching operation for the intermediate frequency signal from the LNBs1, or, when a dividing device 4 is provided as shown in FIG. 7 so as to divide the intermediate frequency signal from a single LNB1 to plural tuners tu, in order to construct a satellite receiving system, the impedance Xc in a transmission line may increase. In this case, the amplitude WL of the pulse signal at the signal input-output circuit t3 becomes lower than the reference amplitude value of the pulse detector circuit. It may result in error operation so that the desired image signal cannot be selected.

Further, the satellite receiving system having the arrangement shown in FIG. 5 in which a single LNB1 and a single tuner tu are directly connected, and the switching device 3 or the dividing device 4 are not provided, the error detection is still possible to occur under inadequate circumstances such as the case where the co-axis cable k is long, where the pulse signal draws blunt waveforms, or where the impedance Xt in the tuner tu is high because of poor condition of the device. Accordingly, when the switching device 3 or the dividing device 4 are provided, the occurrence of error detection becomes more likely, thereby causing customer complaints even when there is no problems on the LNB1 itself.

SUMMARY OF THE INVENTION

The present invention is made in view of the foregoing conventional problems, and an object is to provide a satellite receiving converter which performs receiving operation in response to a control signal supplied from a tuner, and does not cause error operation of an internal circuit by preventing amplitude of the control signal from being largely reduced. The present invention also provides a satellite receiving system adopting the satellite receiving converter.

In order to solve the foregoing problems, a satellite receiving converter of the present invention which is adopted for a satellite receiving system of the present invention amplifies a signal of satellite broadcast received via an antenna and converts the signal into an intermediate frequency signal and outputs the signal thus converted to a tuner while performing receiving operation in response to a control signal supplied from the tuner. The satellite converter has a high impedance circuit for raising impedance with respect to a frequency of the control signal at a signal input-output terminal.

With the foregoing arrangement, the amplitude WL of the control signal at the signal input-output circuit is denoted by the following equation, $$WL = Wt \times XL \div (XL + Xc + Xt)$$

where:

XL represents impedance at the signal input-output circuit of the LNB with respect to a frequency of the control signal;

Xt represents impedance at the external tuner with respect to the frequency of the control signal;

Xc represents impedance at a transmission line such as the co-axial cable provided between the LNB and the tuner; and Wt represents the amplitude of the control signal outputted from the tuner.

Generally, the impedance XL is dozens of Ω, and the impedance Xt is several Ω.

Therefore, by providing the high impedance circuit which sufficiently raise the impedance XL, it is possible to substantially equalize the amplitude WL and the amplitude Wt when the amplitude WL and Wt are supplied to respective circuits in the LNB by preventing the amplitude of the pulse signal from being largely reduced, even when a switching device is provided between the plural LNBs and the tuner so as to carry out switching operation for the output signal from the plural LNBs, or, even when a dividing device is provided so as to divide the intermediate frequency signal from a single LNB to plural tuners, and the impedance in a transmission line increases. This prevents error operation of the respective circuits.

Especially, in the satellite receiving converter of the present invention, it is preferable that the signal input-output terminal is connected to a control circuit to which the control signal is inputted and a low impedance circuit having low impedance with respect to the frequency of the control signal via a cutoff circuit that cuts off the intermediate frequency signal and makes pass through a direct-current voltage and the control signal which are supplied from the tuner, and the high impedance circuit is provided between the cutoff circuit and the low impedance circuit.

As described, the pulse detector circuit is provided in the control circuit for making selection of satellites when plural satellites are received with a single LNB, or for making a selection of plural polarization waves received with the LNB by using the pulse signal inputted from the tuner. The operation of the pulse detector circuit gets out of order when the impedance with respect to the frequency of the control signal at the signal input-output terminal decreases in the low impedance circuit which is connected to the signal input-output terminal via a cutoff circuit, as with the control circuit.

In order to prevent the error operation of the pulse detector circuit, the high impedance circuit for raising impedance with respect to the frequency of the control signal at the signal input-output terminal is provided between the low impedance circuit and the signal input-output terminal as thus described.

Therefore, as thus described, it is possible to substantially equalize the amplitude WL and the amplitude Wt when the amplitude WL and Wt are supplied to the control circuit by preventing the amplitude of the pulse signal from being largely reduced, even when a switching device is provided between the plural LNBs and the tuner so as to carry out switching operation for the output signal from the plural LNBs, or, even when a dividing device is provided so as to divide the intermediate frequency signal from a single LNB to plural tuners, and the impedance in a transmission line increases. This prevents error operation of the control circuit.

Additional objects, features, and strengths of the present invention will be made clear by the description below. Further, the advantages of the present invention will be evident from the following explanation in reference to the drawings.

DESCRIPTION OF THE EMBODIMENTS

[Embodiment 1]

Figure 1:
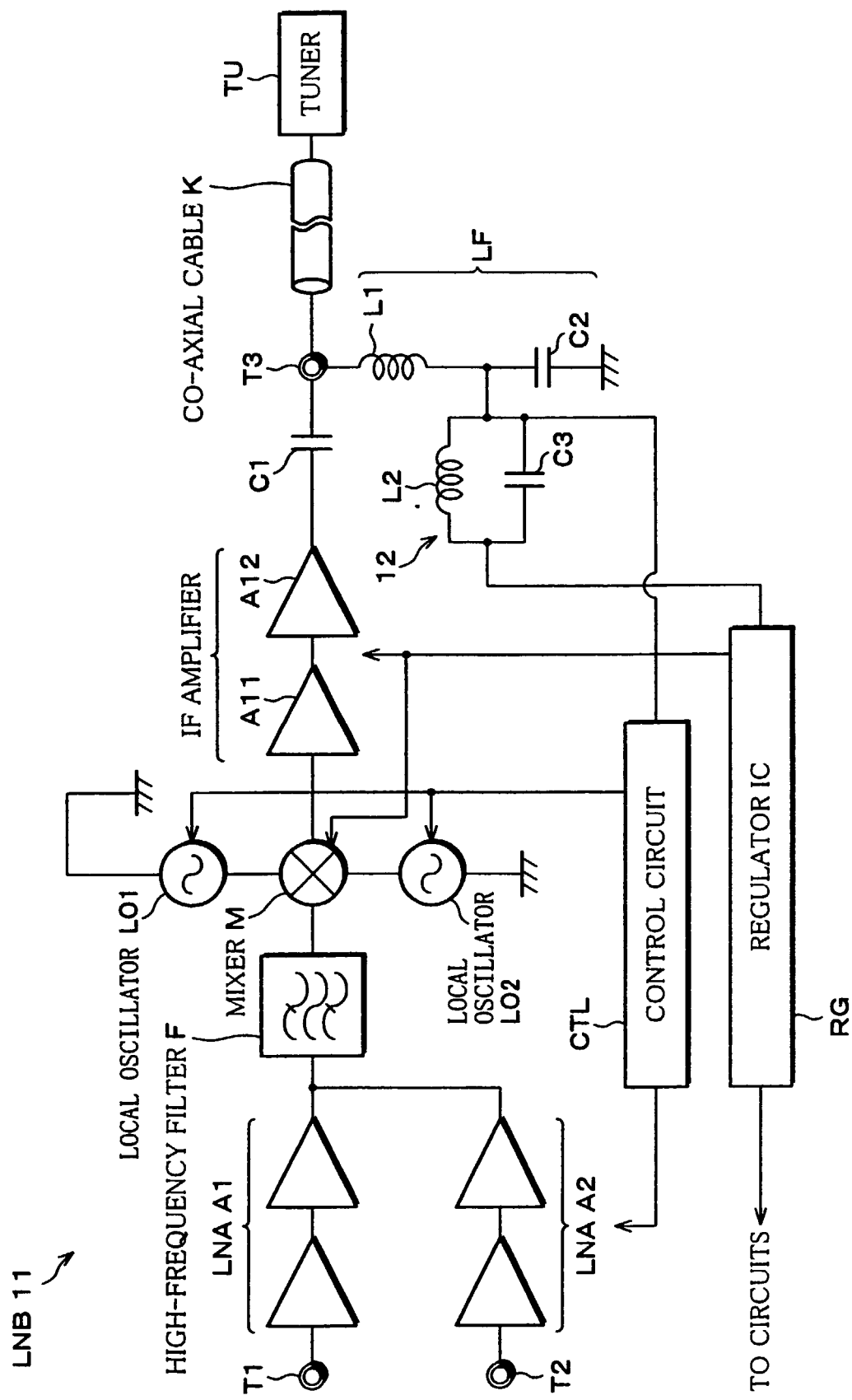
FIG. 1 is a block diagram showing an electrical arrangement of a LNB according to a first embodiment of the present invention, which is a satellite receiving converter.

The following will explain a first embodiment of the present invention with reference to FIG. 1.

FIG. 1 is a block diagram showing an electrical arrangement of a LNB11 according to the first embodiment of the present invention. In the LNB11, a signal of horizontally-polarized wave is inputted to a terminal T1 and a signal of vertically-polarized wave is inputted to a terminal T2, from a receiving horn (not shown).

As it will be described later, the inputted signals are respectively amplified by LNAs A1 and A2 which are selectively activated by a control circuit CTL, then are inputted to a mixer M via a common high frequency filter F. Further, a local oscillation signal is inputted to the mixer M from local oscillators LO1 and LO2 which are selectively activated by the control circuit CTL.

The mixer M downconverts a low-band signal inputted from the terminal T1 or the terminal T2 to an intermediate frequency signal of 950 MHz to 1950 MHz, by mixing it with a local oscillation signal of 9.75 GHz, which is inputted from the local oscillator LO1. Meanwhile, the mixer M downconverts a high-band signal inputted from the terminal T1 or the terminal T2 to an intermediate frequency signal of 1150 MHz to 2150 MHz, by mixing it with a local oscillation signal of 10.6 GHz, which is inputted from the local oscillator LO2.

The intermediate frequency signal downconverted by the mixer M is outputted to a signal input-output terminal T3 via plural one stage amplifiers A11 and A12 and a coupling capacitor C1. Further, the intermediate frequency signal is inputted to an external tuner TU from the signal input-output terminal T3 via a co-axial cable K.

Meanwhile, a direct-current voltage, used as a power source and for switching polarization wave, and a control signal for selecting a receiving band are inputted to the signal input-output terminal T3 from the tuner TU via the co-axial cable K. The control signal is a pulse signal having the maximum amplitude Vs of 0.8 $V_{p-p}$ and the frequency F of 22 kHz, for example. The control signal is inputted to the control circuit CTL via a low-pass filter LF which cuts off the intermediate frequency signal. The low-pass filter LF is made up of an inductor L1 and a capacitor C2.

The control circuit CTL selectively activates the local oscillators LO1 and LO2 in response to the control signal. The direct-current voltage is inputted to a regulator ICRG and the control circuit CTL via the low-pass filter LF. The regulator ICRG stabilizes the inputted direct-current voltage to be a predetermined value and supplies the voltage to respective circuits as the power source. The regulator LCrg is equipped with an input capacitor and an output capacitor (both not shown) so as to compose a power supply circuit. The control circuit CTL switches between the LNAs A1 and A2 according to the inputted direct-current voltage, which are either of 13V or 18V.

The notable difference of the LNB11 is a trap circuit 12 serially provided between the low-pass filter LF and the power supply circuit (low impedance circuit) having low impedance with respect to the frequency f of the pulse signal, i.e., between the low-pass filter LF and the input capacitor of the regulator ICRG. The trap circuit 12 is a parallel resonant circuit made up of an inductor L2 and a capacitor C3, and is provided for raising the impedance with respect to the frequency f of the pulse signal at the signal input-output terminal T3.

With this arrangement, the impedance XL with respect to the frequency f of the pulse signal at the signal input-output terminal T3 will be increased to about 1.8 kΩ, as the impedance in the trap circuit 12 is added to the original impedance of about 50 Ω which is mainly determined by the input capacitor of the regulator ICRG.

Further, the trap circuit 12 is provided between the low-pass filter LF and the input capacitor of the regulator ICRG, and the control circuit CTL is directly connected to the low-pass filter LF. Thus, the influence of the input capacitor of the regulator ICRG on the impedance with respect to the frequency f of the pulse signal at the input side of the control circuit CTL will be reduced, thereby ensuring high impedance for the input impedance of the control circuit CTL.

Figure 6:
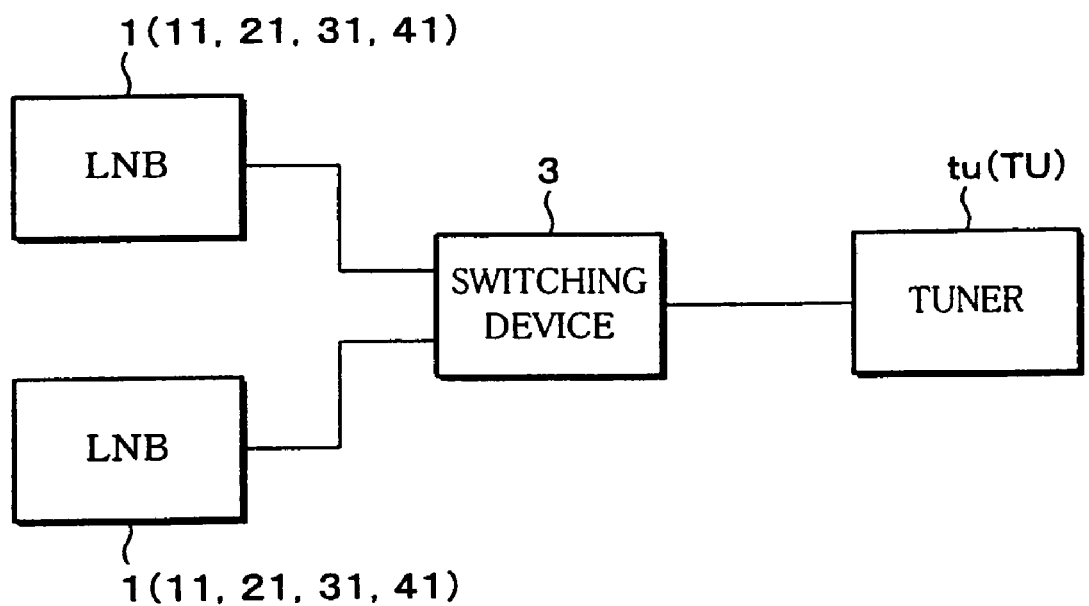
FIG. 6 is a drawing showing an example of an arrangement of a satellite receiving system which switches an intermediate frequency signal from plural LNBs and inputs the same to a single tuner.
Figure 7:
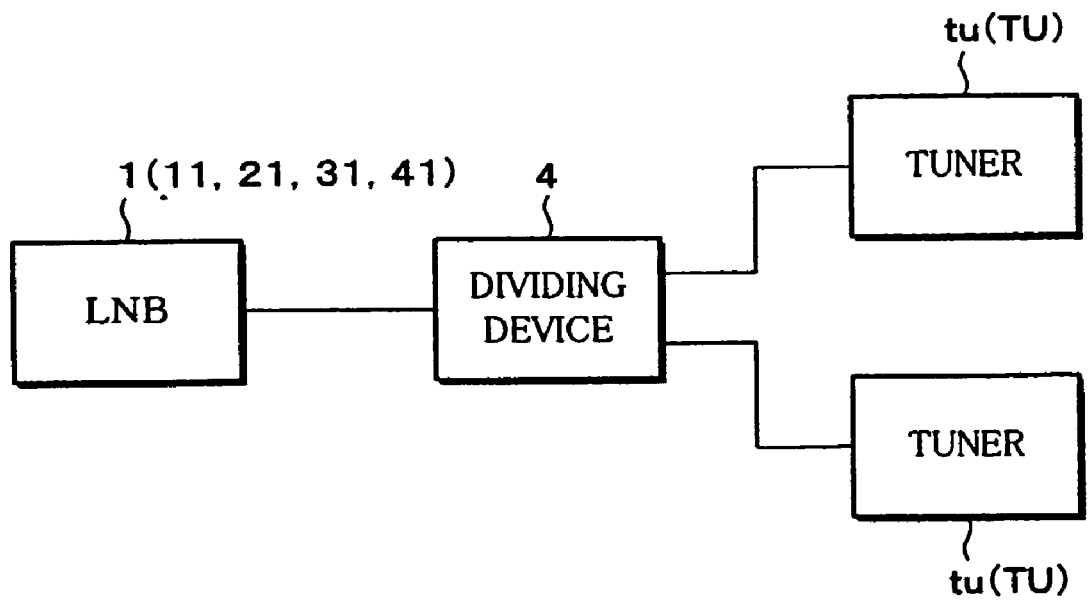
FIG. 7 is a drawing showing an example of an arrangement of a satellite receiving system which divides an intermediate frequency signal from a single LNB with a dividing device and inputs the same to plural tuners.

As described, it is possible to prevent the amplitude WL of the pulse signal from being largely reduced, and make the amplitude WL to be substantially equal to the amplitude Wt of the tuner TU even when a switching device 3 is provided between the plural LNBs11 and the tuner TU as shown in FIG. 6 so as to carry out switching operation for the intermediate frequency signal from the plural LNBs11, or, even when a dividing device 4 is provided as shown in FIG. 7 so as to divide the intermediate frequency signal from a single LNB11 to plural tuners, and the impedance Xc in a transmission line increases. This prevents error operation of an internal circuit, such as a pulse detector circuit, of the control circuit CTL.

[Embodiment 2]

Figure 2:
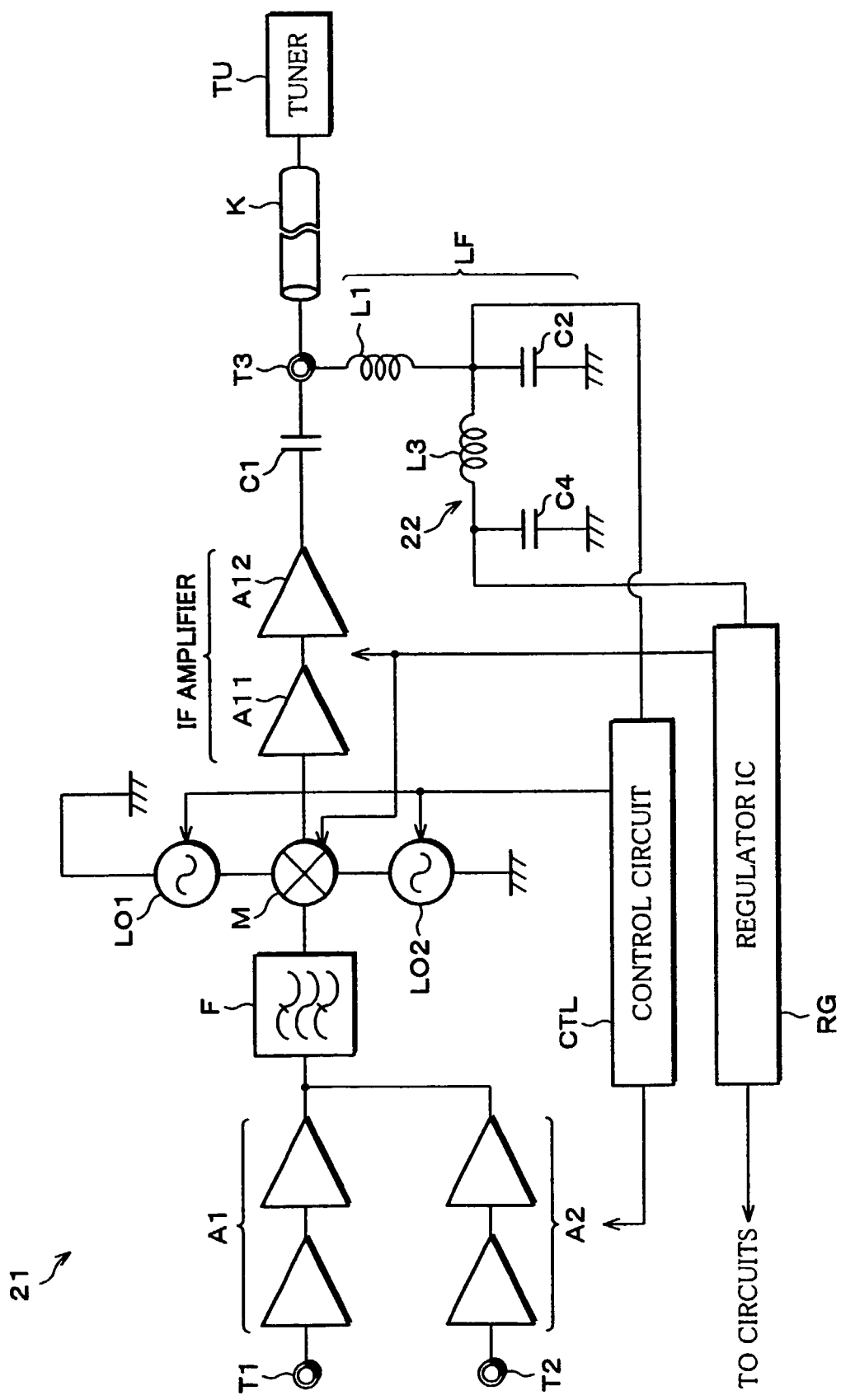
FIG. 2 is a block diagram showing an electrical arrangement of a LNB according to a second embodiment of the present invention

The following will explain another embodiment of the present invention with reference to FIG. 2. For ease of explanation, materials having the equivalent functions as those shown in the drawings pertaining to Embodiment 1 above will be given the same reference symbols, and explanation thereof will be omitted here.

FIG. 2 is a block diagram showing an electrical arrangement of a LNB21 according to the second embodiment of the present invention. The LNB21 is similar to the described LNB11. The difference between the LNB11 and the LNB21 is an inductor L3 and a capacitor C4 provided instead of the trap circuit 12 of the LNB11. The inductor L3 and the capacitor C4 are respectively provided in series and in parallel between the low-pass filter LF and the input capacitor of the regulator ICRG. The inductor L3 and the capacitor C4 make up a low-pass filter 22.

With this arrangement, it is possible to increase the impedance XL at the signal input-output terminal T3 to about 800 Ω.

Further, also this being the case, the low-pass filter circuit 22 is provided between the low-pass filter LF and the input capacitor of the regulator ICRG, and the control circuit CTL is directly connected to the low-pass filter LF. Thus, the influence of the input capacitor of the regulator ICRG on the impedance with respect to the frequency f of the pulse signal at the input side of the control circuit CTL will be reduced, thereby ensuring high impedance for the input impedance of the control circuit CTL.

[Embodiment 3]

Figure 3:
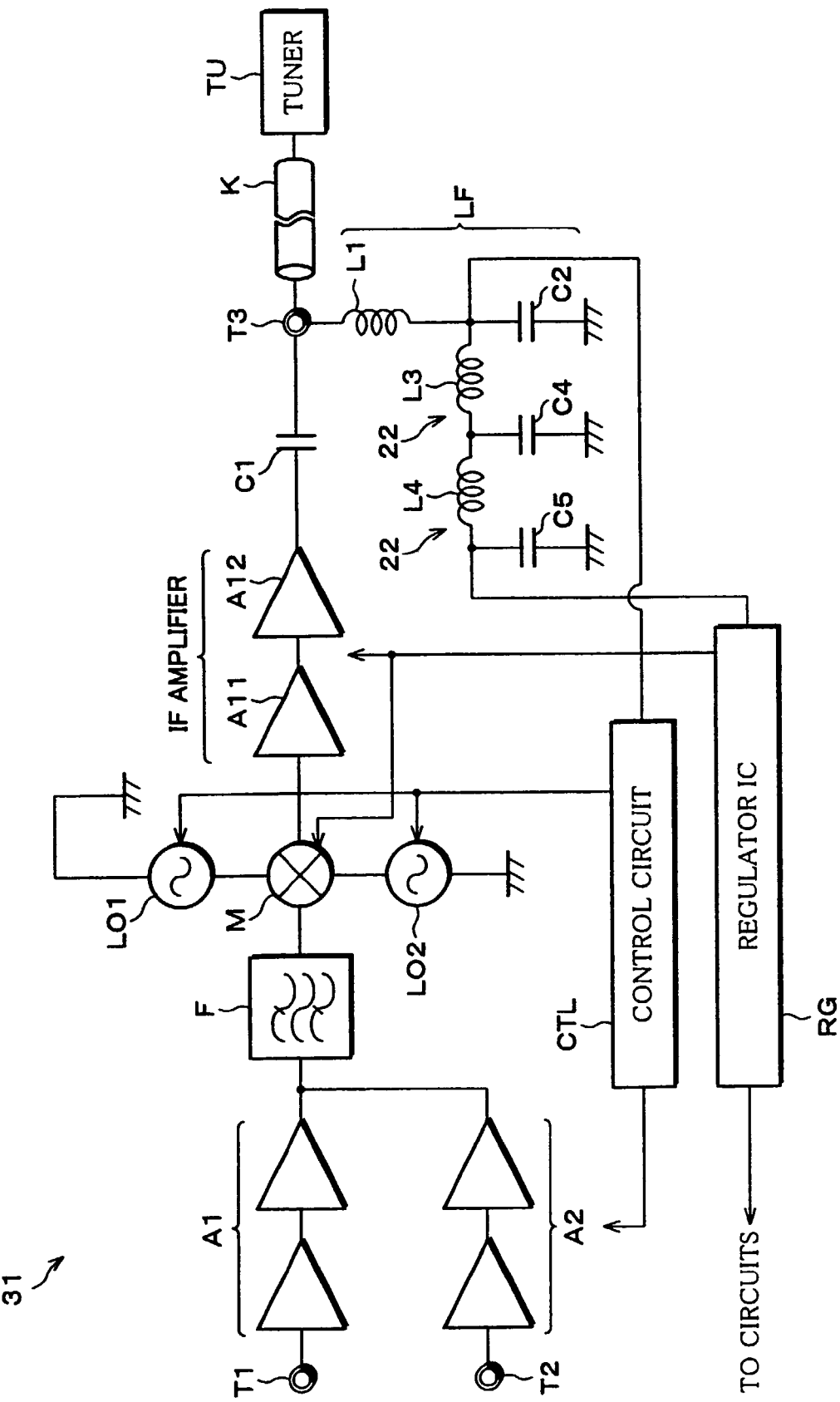
FIG. 3 is a block diagram showing an electrical arrangement of a LNB according to a third embodiment of the present invention.

The following will explain another embodiment of the present invention with reference to FIG. 3. For ease of explanation, materials having the equivalent functions as those shown in the drawings pertaining to Embodiments 1 and 2 above will be given the same reference symbols, and explanation thereof will be omitted here.

FIG. 3 is a block diagram showing an electrical arrangement of a LNB31 according to the third embodiment of the present invention. The LNB31 is similar to the described LNB21.

The LNB21 had a single stage low-pass filter 22 made up of the inductor L3 and the capacitor C4; however, the LNB31 has another low-pass filter 22 made up of an inductor L4 and a capacitor C5 in addition to the low-pass filter 22 of LNB21.

With this arrangement, it is possible to increase the impedance XL at the signal input-output terminal T3 to about 1.4 kΩ. Note that, a larger number of the low-pass filters 22 may suitably be provided.

Further, also this being the case, the low-pass filter circuits 22 and 22 are provided between the low-pass filter LF and the input capacitor of the regulator ICRG, and the control circuit CTL is directly connected to the low-pass filter LF. Thus, the influence of the input capacitor of the regulator ICRG on the impedance with respect to the frequency f of the pulse signal at the input side of the control circuit CTL will be reduced, thereby ensuring high impedance for the input impedance of the control circuit CTL.

[Embodiment 4]

Figure 4:
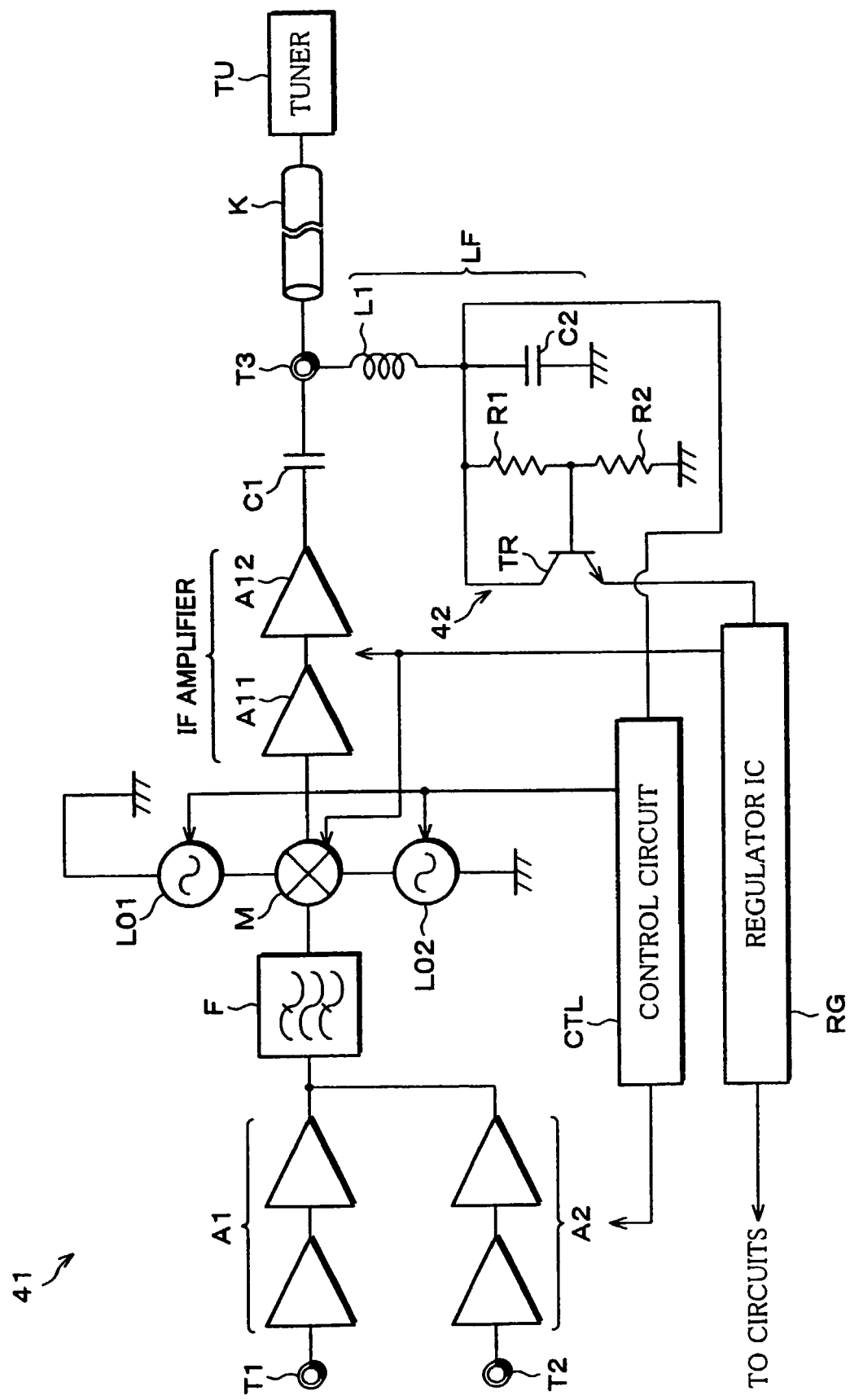
FIG. 4 is a block diagram showing an electrical arrangement of a LNB according to a third embodiment of the present invention.
Figure 5:
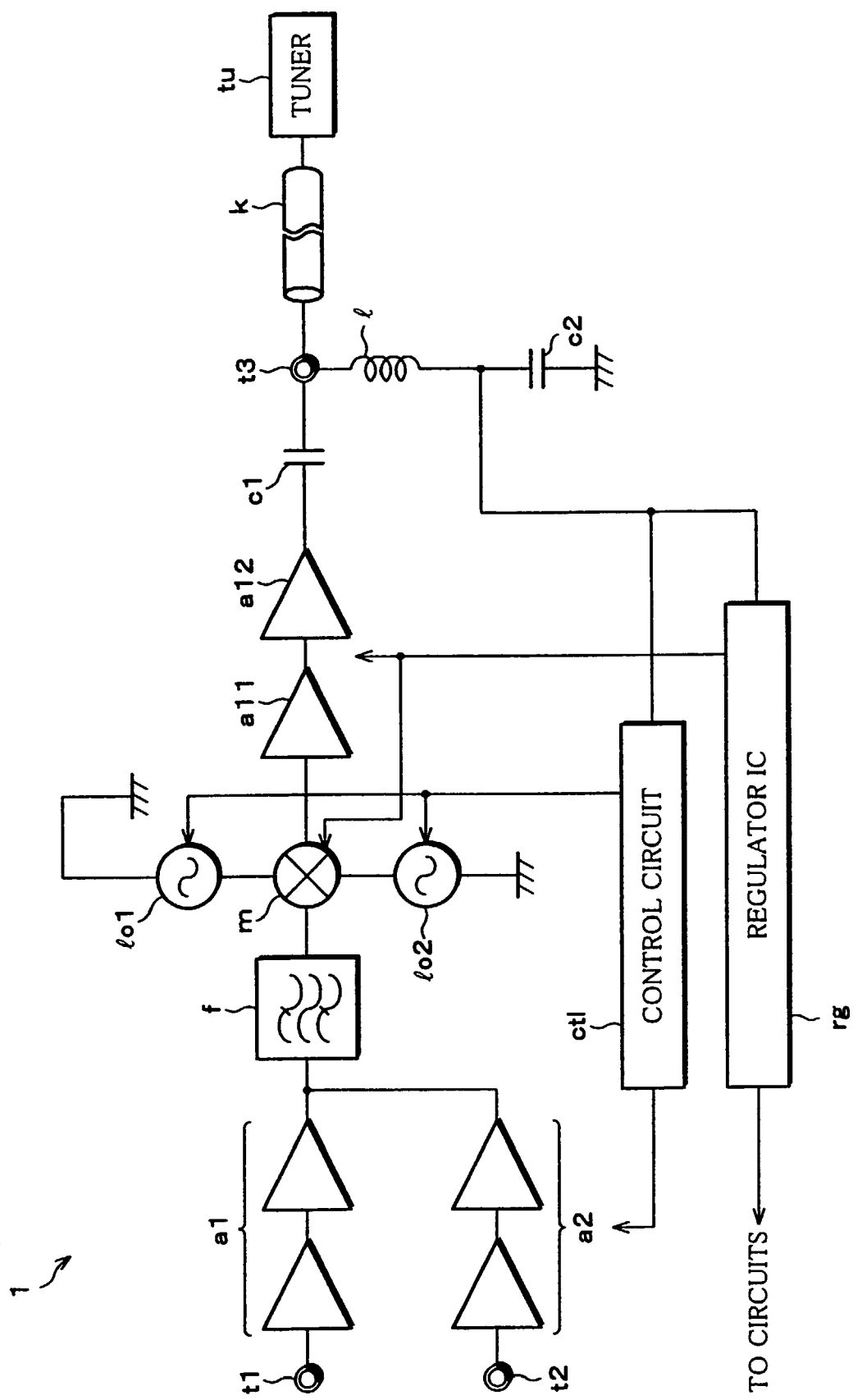
FIG. 5 is a block diagram showing an electrical arrangement of a LNB adopting a typical conventional technique.

The following will explain another embodiment of the present invention with reference to FIG. 4. For ease of explanation, materials having the equivalent functions as those shown in the drawings pertaining to Embodiment 1 above will be given the same reference symbols, and explanation thereof will be omitted here.

FIG. 4 is a block diagram showing an electrical arrangement of a LNB41 according to the fourth embodiment of the present invention. The LNB41 is similar to the described LNB11. Instead of the trap circuit 12 of the LNB11, the LNB 41 has an emitter-follower circuit 42 which is realized by a transistor TR provided between the low-pass filter LF and the input capacitor of the regulator ICRG. The emitter-follower circuit 42 is provided for raising the impedance with respect to the frequency f of the pulse signal at the signal input-output terminal T3.

In the emitter-follower circuit 42, the output from the low-pass filter LF made up of the inductor L1 and the capacitor C2 is inputted to a collector of the transistor TR and also to a base via the bias resistors R1 and R2. Further, the output from the emitter is inputted to the control circuit CTL and the regulator ICRG.

With this arrangement, it is possible to increase the impedance at the signal input-output terminal T3 to about 300 Ω.

Further, also this being the case, the emitter-follower circuit 42 is provided between the low-pass filter LF and the input capacitor of the regulator ICRG, and the control circuit CTL is directly connected to the law-pass filter LF. Thus, the influence of the input capacitor of the regulator ICRG on the impedance with respect to the frequency f of the pulse signal at the input side of the control circuit CTL will be reduced, thereby ensuring high impedance for the input impedance of the control circuit CTL.

As has been described, the satellite receiving converter of the present invention is realized as a LNB having an arrangement such that an high impedance circuit is provided for raising the impedance at the signal input-output circuit with respect to the frequency of the control signal outputted from the tuner.

With this arrangement, it is possible to prevent the amplitude of the pulse signal from being largely reduced even when a switching device is provided between the plural LNBs and the tuner so as to carry out switching operation for the output signal from the plural LNBs, or, even when a dividing device is provided so as to divide the intermediate frequency signal from a single LNB to plural tuners, and the impedance in a transmission line increases. This prevents error operation of an internal circuit.

Especially, in the satellite receiving converter of the present invention, it is preferable that the signal input-output terminal is connected to a control circuit to which the control signal is inputted and a low impedance circuit having low impedance with respect to the frequency of the control signal via a cutoff circuit that cuts off the intermediate frequency signal and makes pass through a direct-current voltage and the control signal which are supplied from the tuner, and the high impedance circuit is provided between the cutoff circuit and the low impedance circuit.

As described, the pulse detector circuit is provided in the control circuit for making selection of satellites when plural satellites are received with a single LNB, or for making a selection of plural polarization waves received with the LNB by using the pulse signal inputted from the tuner. The operation of the pulse detector circuit gets out of order when the impedance with respect to the frequency of the control signal at the signal input-output terminal decreases in the low impedance circuit which is connected to the signal input-output terminal via a cutoff circuit, as with the control circuit.

In order to prevent the error operation of the pulse detector circuit, the high impedance circuit for raising impedance with respect to the frequency of the control signal at the signal input-output terminal is provided between the low impedance circuit and the signal input-output terminal as thus described.

Therefore, as thus described, it is possible to substantially equalize the amplitude WL and the amplitude Wt when the amplitude WL and Wt are supplied to the control circuit by preventing the amplitude of the pulse signal from being largely reduced, even when a switching device is provided between the plural LNBs and the tuner so as to carry out switching operation for the output signal from the plural LNBs, or, even when a dividing device is provided so as to divide the intermediate frequency signal from a single LNB to plural tuners, and the impedance in a transmission line increases. This prevents error operation of the control circuit.

The high impedance circuit can be a trap circuit provided between the cutoff circuit for the intermediate frequency signal and the low impedance circuit.

With this arrangement, the impedance XL with respect to the frequency of the pulse signal at the signal input-output terminal of the LNB will be increased to about 1.8 kΩ, as the impedance in the trap circuit is added to the original impedance of about 50 Ω which is mainly determined by the input capacitor of the regulator IC.

Further, the high impedance circuit can be a low-pass filter having a cutoff frequency lower than that of the control signal and is provided between the cutoff circuit for the intermediate frequency signal and the low impedance circuit.

With this arrangement, it is possible to increase the impedance XL at the signal input-output terminal to about 800 Ω.

Further, a plurality of the low-pass filters may be provided. For example, providing two low-pass filters can increase the impedance XL at the signal input-output terminal to about 1.4 kΩ.

Further, the high impedance circuit can be an emitter-follower circuit which is realized by a transistor provided between the cutoff circuit for the intermediate frequency signal and the low impedance circuit.

With this arrangement, it is possible to increase the impedance XL at the signal input-output terminal to about 300 Ω.

Further, the satellite receiving system of the present invention is a satellite receiving system including a plurality of satellite receiving converters, a tuner; and a switching device which carries out switching operation with respect to output signals of the plurality of satellite receiving converters so as to input an output signal that has been selected to the tuner, wherein the satellite receiving converter amplifies a signal of satellite broadcast received via an antenna and converts the signal into an intermediate frequency signal and outputs the converted signal to a tuner while performing receiving operation in response to a control signal inputted from the tuner, and at least one of the plurality of satellite receiving converters includes a high impedance circuit for raising impedance with respect to a frequency of the control signal at a signal input-output terminal.

Further, the satellite receiving system of the present invention is a satellite receiving system including a satellite receiving converter, a plurality of tuners; and a dividing device which divides an intermediate frequency signal from the satellite receiving converter so as to supply signals thus divided to the plurality of tuners, wherein the satellite receiving converter amplifies a signal of satellite broadcast received via an antenna and converts the signal into an intermediate frequency signal and outputs the signal thus converted to at least one of the plurality of tuners via the dividing device while performing receiving operation in response to a control signal supplied from at least one of the plurality of tuners, and the satellite receiving converter includes a high impedance circuit for raising impedance with respect to a frequency of the control signal at a signal input-output terminal.

With this arrangement, the impedance Xc (calculated by the afore-stated equation) in a cable between the satellite receiving converter (LNB) and the tuner increase. In this case, raising the impedance XL of the satellite receiving converter at the signal input-output terminal provides remarkable effect, as it prevents the error operation due to the increase of the impedance Xc.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A satellite receiving converter which amplifies a signal of satellite broadcast received via an antenna and converts the signal into an intermediate frequency signal and outputs the signal thus converted to a tuner while performing receiving operation in response to a control signal supplied from the tuner, comprising:
    a high impedance circuit for raising impedance with respect to a frequency of the control signal at a signal input-output terminal, the signal input-output terminal is a signal input-output terminal of the tuner,
    wherein the high impedance circuit non-negligibly raises an impedance at the signal input-output terminal.

2. The satellite receiving converter as set forth in claim 1, wherein:
    the signal input-output terminal is connected to a control circuit to which the control signal is inputted and a low impedance circuit having low impedance with respect to the frequency of the control signal via a cutoff circuit that cuts off the intermediate frequency signal and makes pass through a direct-current voltage and the control signal which are supplied from the tuner, and the high impedance circuit is provided between the cutoff circuit and the low impedance circuit.

3. The satellite receiving converter as set forth in claim 2, wherein:
    the high impedance circuit is a trap circuit provided between the cutoff circuit and the low impedance circuit.

4. The satellite receiving converter as set forth in claim 2, wherein:
    the high impedance circuit is a low-pass filter having a cutoff frequency lower than the frequency of the control signal, the low-pass filter being provided between the cutoff circuit and the low impedance circuit.

5. The satellite receiving converter as set forth in claim 2, wherein:
    the high impedance circuit is a plurality of low-pass filters provided in series having a cutoff frequency lower than the frequency of the control signal, the plurality of low-pass filters being provided between the cutoff circuit and the low impedance circuit.

6. The satellite receiving converter as set forth in claim 2, wherein:
    the high impedance circuit is an emitter-follower circuit which is realized by a transistor, the emitter-follower circuit being provided between the cutoff circuit and the low impedance circuit.

7. The satellite receiving converter as set forth in claim 2, wherein:
    the low impedance circuit stabilizes the direct-current voltage thus supplied from the tuner to be a predetermined voltage and supplies the direct-current voltage which has been stabilized to respective circuits as power source.

8. The satellite receiving converter as set forth in claim 1, wherein:
    the high impedance circuit is provided between a low impedance circuit and the signal input-output terminal.

9. A satellite receiving system, comprising:
    a plurality of satellite receiving converters;
    a tuner; and
    a switching device which carries out switching operation with respect to output signals of the plurality of satellite receiving converters so as to input an output signal that has been selected to the tuner,
    wherein:
    at least one of the satellite receiving converters amplifies a signal of satellite broadcast received via an antenna and converts the signal into an intermediate frequency signal and outputs the signal thus converted to a tuner while performing receiving operation in response to a control signal supplied from the tuner, and
    at least one of the plurality of satellite receiving converters includes a high impedance circuit for raising impedance with respect to a frequency of the control signal at a signal input-output terminal, the signal input-output terminal is a signal input-output terminal of the tuner,
    wherein the high impedance circuit non-negligibly raises an impedance at the signal input-output terminal.

10. The satellite receiving converter as set forth in claim 9, wherein:
    the high impedance circuit is provided between a low impedance circuit and the signal input-output terminal.

11. A satellite receiving system, comprising:
    a satellite receiving converter;
    a plurality of tuners; and
    a dividing device which divides an intermediate frequency signal from the satellite receiving converter so as to supply signals thus divided to the plurality of tuners, wherein:
the satellite receiving converter amplifies a signal of satellite broadcast received via an antenna and converts the signal into an intermediate frequency signal and outputs the signal thus converted to at least one of the plurality of tuners via the dividing device while performing receiving operation in response to a control signal supplied from at least one of the plurality of tuners, and
the satellite receiving converter includes a high impedance circuit for raising impedance with respect to a frequency of the control signal at a signal input-output terminal the signal input-output terminal is a signal input-output terminal of the at least one of the plurality of tuners,
wherein the high impedance circuit non-negligibly raises an impedance at the signal input-output terminal.

12. The satellite receiving converter as set forth in claim 11, wherein:
the high impedance circuit is provided between a low impedance circuit and the signal input-output terminal.

* * * * *